United States Patent
Chainani et al.

(10) Patent No.: US 10,331,527 B2
(45) Date of Patent: *Jun. 25, 2019

(54) ACCELERATED RECOVERY AFTER A DATA DISASTER

(71) Applicant: International Business Machines Corporation, Armonk, NY (US)

(72) Inventors: Naresh K. Chainani, Portland, OR (US); Kiran K. Chinta, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/366,066

(22) Filed: Dec. 1, 2016

(65) Prior Publication Data

US 2017/0083414 A1 Mar. 23, 2017

Related U.S. Application Data

(63) Continuation of application No. 14/836,083, filed on Aug. 26, 2015, now Pat. No. 9,619,344, which is a
(Continued)

(51) Int. Cl.
*G06F 11/00* (2006.01)
*G06F 11/14* (2006.01)
(Continued)

(52) U.S. Cl.
CPC .......... *G06F 11/1471* (2013.01); *G06F 11/00* (2013.01); *G06F 11/1464* (2013.01);
(Continued)

(58) Field of Classification Search
CPC ............. G06F 2201/84; G06F 11/1469; G06F 11/1471
See application file for complete search history.

(56) References Cited

U.S. PATENT DOCUMENTS 7,725,428 B1 5/2010 Hawkins et al.
8,386,733 B1 * 2/2013 Tsaur ...................... G06F 12/00
(Continued)

OTHER PUBLICATIONS

Brooks, C. et al.; "Disaster Recovery Solutions for IBM TotalStorage San File System"; IBM Corporation, http://www.ibm.com/redbooks/sg24-7157-00 . . . , Jan. 2006.
(Continued)

*Primary Examiner* — Charles Ehne
(74) *Attorney, Agent, or Firm* — Nicholas Bowman; Edell, Shapiro & Finnan, LLC (57) ABSTRACT

According to embodiments of the present invention, a metadata file is transferred from the first system to the second system and a database on the second system is initialized based on the metadata file. An image, including information of the first system to be restored, is transferred from the first system to the second system, and restoration of the information to the second system based on the image is initiated. Prior to completion of the restoration, one or more log files indicating actions performed on the first system relating to the information to be restored is transferred from the first system to the initialized database on the second system. In response to completion of the restoration, the actions of the log files are performed to synchronize the restored data on the second system with the first system.

8 Claims, 11 Drawing Sheets

Related U.S. Application Data continuation of application No. 14/626,210, filed on Feb. 19, 2015, now Pat. No. 9,619,343.

(51) Int. Cl.
 *G06F 16/27* (2019.01)
 *G06F 16/23* (2019.01)

(52) U.S. Cl.
 CPC ...... *G06F 11/1466* (2013.01); *G06F 11/1469* (2013.01); *G06F 16/2372* (2019.01); *G06F 16/275* (2019.01); *G06F 2201/80* (2013.01); *G06F 2201/805* (2013.01); *G06F 2201/82* (2013.01); *G06F 2201/84* (2013.01)

(56) References Cited

U.S. PATENT DOCUMENTS

| | | | |
|---|---|---|---|
| 8,600,952 B2 | 12/2013 | Blitzer et al. | |
| 8,769,336 B1 | 7/2014 | Natanzon et al. | |
| 8,639,897 B1 * | 12/2014 | Brocco | G06F 11/1469 |
| 2005/0283504 A1 | 12/2005 | Suzuki et al. | |
| 2006/0179347 A1 | 8/2006 | Anderson, Jr. et al. | |
| 2007/0055833 A1 * | 3/2007 | Vu | G06F 12/16 |
| 2007/0220321 A1 | 9/2007 | Iqbal et al. | |
| 2009/0012932 A1 | 1/2009 | Romen et al. | |
| 2009/0249119 A1 * | 10/2009 | Sethumadhavan | G06F 11/07 |
| 2012/0151250 A1 | 6/2012 | Saika | |
| 2013/0191347 A1 | 7/2013 | Bensinger | |
| 2015/0212894 A1 * | 7/2015 | Pawar | G06F 11/1448 707/679 |
| 2015/0212897 A1 * | 7/2015 | Kottomtharayil | G06F 11/1448 714/20 |
| 2016/0098568 A1 * | 4/2016 | Bushman | G06F 21/60 |
| 2016/0246685 A1 | 8/2016 | Chainani et al. | |
| 2016/0246688 A1 | 8/2016 | Chainani et al. | |

OTHER PUBLICATIONS

Osuna, A. et al.; "Planning for the Unplanned: DB2 9 Disaster Recovery with IBM System Storage N Series"; IBM Corporation, http://www.ibm.com/redbooks/redp4425-00 . . . , 2008.

List of IBM Patents or Patent Applications Treated as Related, Dec. 1, 2016.

\* cited by examiner

ACCELERATED RECOVERY AFTER A DATA DISASTER

CROSS-REFERENCE TO RELATED APPLICATIONS

This application is a continuation of U.S. patent application Ser. No. 14/836,083, entitled "ACCELERATED RECOVERY AFTER A DATA DISASTER" and filed Aug. 26, 2015, which is a continuation of U.S. patent application Ser. No. 14/626,210, entitled "ACCELERATED RECOVERY AFTER A DATA DISASTER" and filed Feb. 19, 2015, the disclosures of which are incorporated herein by reference in their entireties.

BACKGROUND

Present invention embodiments relate to disaster recovery, and more specifically, to accelerated recovery after a data disaster event.

High Availability and Disaster Recovery (HADR) solutions are commonly used to protect against unexpected outages. Systems deploying HADR generally involve a primary system and a stand-by system. In the event of a disaster on the primary site, the stand-by system provides complete functionality of the primary system. Techniques such as log replication may be used to efficiently keep the primary and stand-by systems synchronized. Initializing a stand-by system or re-establishing a stand-by system after a disaster event can be time consuming, especially when data volumes are in the terabyte (TB) or petabyte (PB) range.

For example, databases may have up to 6 TB or more of storage, and may generate and archive 500 GB of log file data daily—with up to 200 GB of log file data generated in a single hour. Accordingly, in the event that the primary database is lost, the stand-by database may function as the primary database. In typical cases involving large databases, it may take more than a week to recover (re-establish the stand-by database) due to the size of the database as well as the amount of log files generated during the recovery process.

SUMMARY

According to embodiments of the present invention, a metadata file is transferred from a first system to a second system and a database on the second system is initialized based on the metadata file. An image, including information of the first system to be restored, is transferred from the first system to the second system, and restoration of the information to the second system based on the image is initiated. Prior to completion of the restoration, one or more log files indicating actions performed on the first system relating to the information to be restored is transferred from the first system to the initialized database on the second system. In response to completion of the restoration, the actions of the log files are performed on the second system to synchronize the restored data with the first system.

These and other aspects, features and embodiments of the present invention will be understood with reference to the drawing figures and the detailed description herein, and will be realized by way of the various elements and combinations particularly pointed out in the appended claims. It is to be understood that both the foregoing general description and the following brief description of the drawings and detailed description are examples and explanatory of preferred embodiments of the invention, and are not restrictive of present invention embodiments, as claimed.

BRIEF DESCRIPTION OF THE SEVERAL VIEWS OF THE DRAWINGS

Generally, like reference numerals in the various figures are utilized to designate like components.

DETAILED DESCRIPTION

High Availability and Disaster Recovery (HADR) solutions are commonly used to protect against unexpected data outages. Systems deploying HADR typically involve a primary system and a stand-by system. In the event of a disaster on the primary site, the stand-by system assumes the complete functionality of the primary system. Existing approaches to data recovery may employ a sequential process that involves: (1) backup image transfer and restoration at the stand-by site (as well as updating configurations of the stand-by database), (2) sending log files from the primary to the stand-by database, and (3) receiving and replaying log files at the stand-by database to bring the stand-by database up-to-date with the primary database.

The time taken by the above steps can range from several hours to several days depending on the volume of data. Furthermore, while the stand-by system is being initialized, the primary system continues to process transactions and generate potentially huge amounts of log data. Until the backup image and all log files are transferred to the stand-by site, the organization does not have HADR protection and is exposed to data loss. Thus, in current approaches, protection against data loss is not achieved until replay of log files is complete.

According to present invention embodiments, a lightweight database is established and log files are shipped to the lightweight database to accelerate the recovery process. In some embodiments, log files may comprise data relating to transactions, including, but not limited to, variables, values, record numbers, timestamps, sequence numbers, etc. Present invention embodiments are described in additional detail with reference to the description below and FIGS. 1A-6.

Figure 1A:
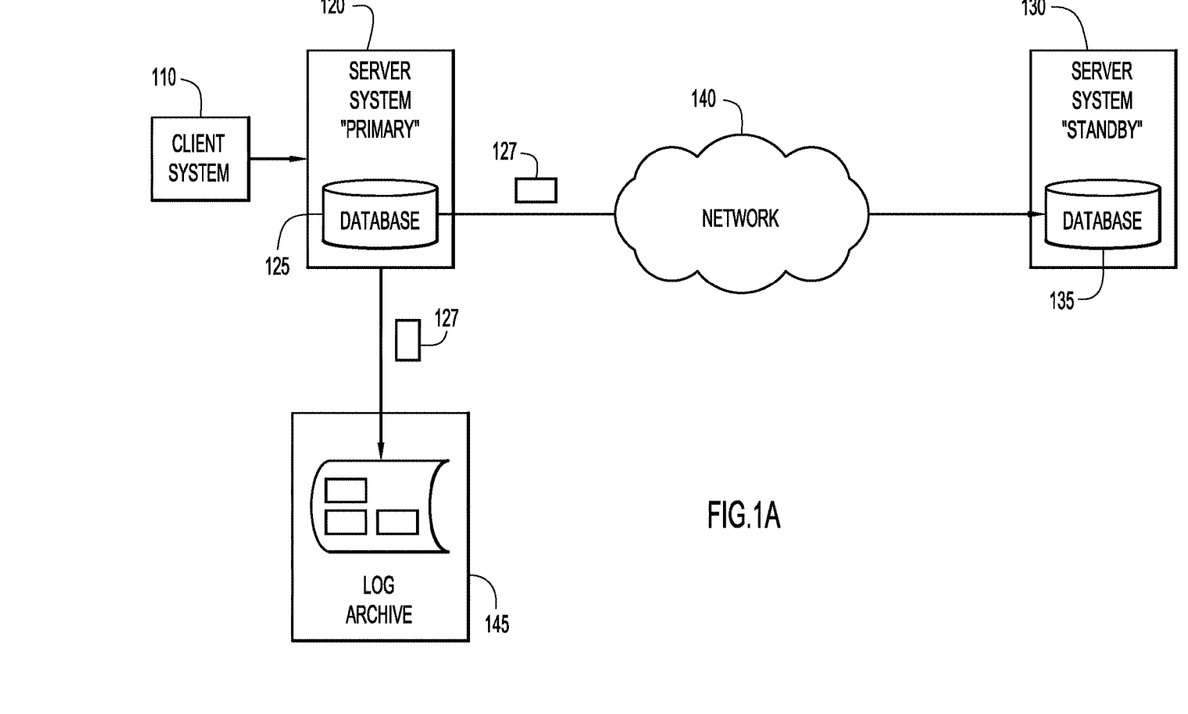
FIG. 1A is an illustration showing an example computing environment for a system having disaster recovery capabilities and operating under normal conditions in accordance with an embodiment of the present invention.
Figure 1B:
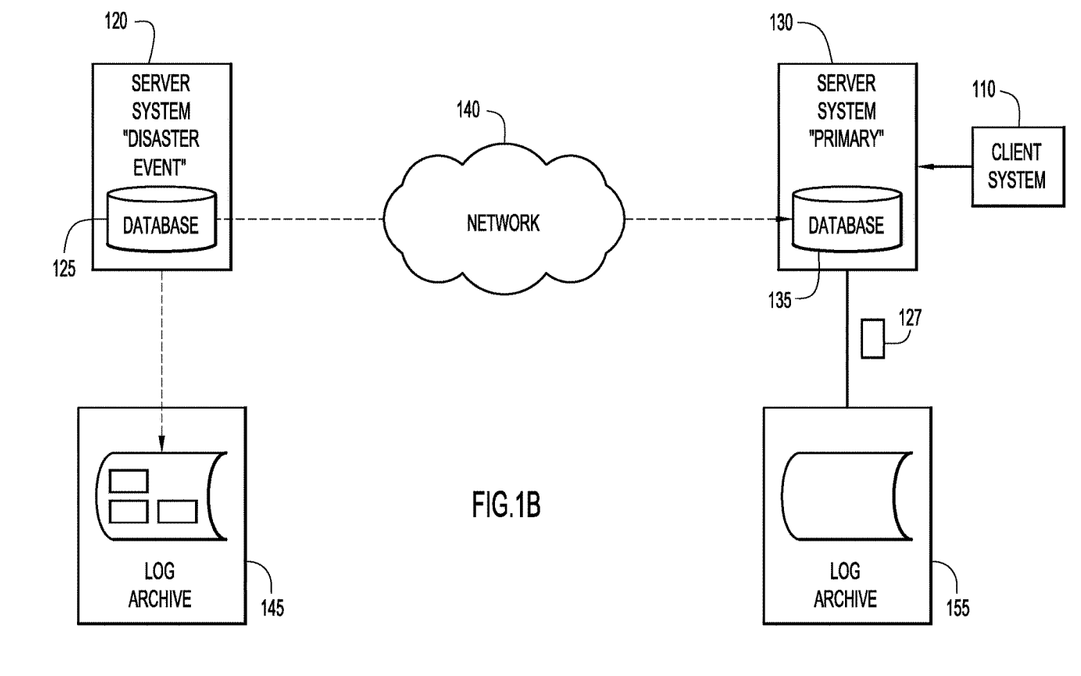
FIG. 1B is an illustration showing an example computing environment for a system having disaster recovery capabilities and where a disaster has occurred in accordance with an embodiment of the present invention.
Figure 1C:
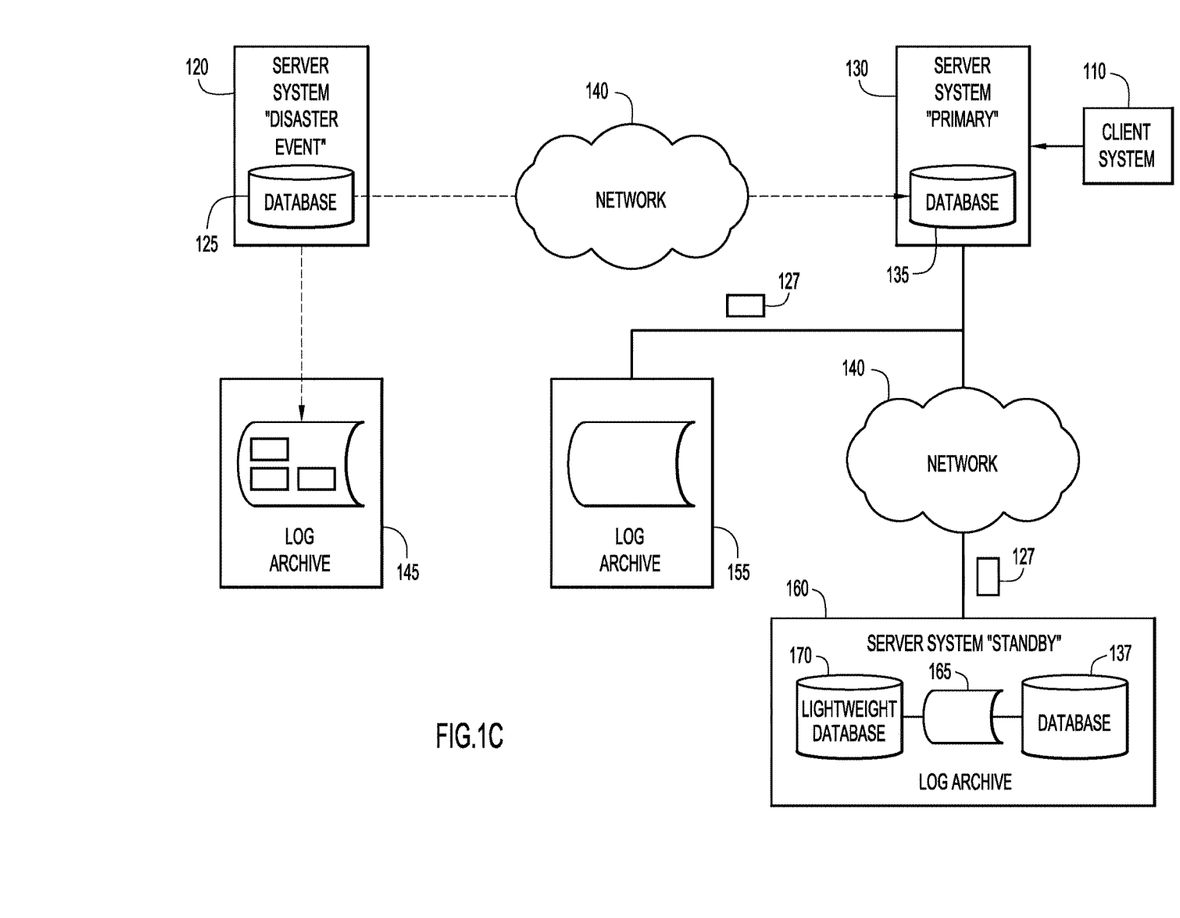
FIG. 1C is an illustration showing an example computing environment for a system having disaster recovery capabilities and where accelerated recovery is performed in accordance with an embodiment of the present invention.

An example environment for use with present invention embodiments is illustrated in FIGS. 1A-1C. Specifically, the environment may include one or more server systems 120, 130 and 160 and one or more client or end-user systems 110. Server systems 120, 130, 160 and client system 110 may be remote from each other and communicate over a network 140. The network may be implemented by any number of any suitable communications media (e.g., wide area network (WAN), local area network (LAN), Internet, Intranet, etc.). Alternatively, server systems 120, 130, 160 and client systems 110 may be local to each other, and communicate via any appropriate local communication medium (e.g., local area network (LAN), hardwire, wireless link, Intranet, etc.).

Referring to FIG. 1A, under normal operations, server system 120 functions as a "primary" server to process various types of transactions, e.g., purchases, money withdrawals, etc., based upon input received from client system 110. Results may be stored in database 125. Server system 120 may be in communication with a log archive 145, which usually is located locally to server system 120. Data associated with one or more transactions may be written to a log file, transmitted as packets 127, and the log file(s) may be stored on a local disk, e.g., log archive 145. In addition, packets 127 may be sent to server system 130, designated as a "stand-by" server system. In other embodiments, a log archive may be located in a remote system with high speed data access.

A stand-by server typically functions as part of a data loss prevention system for disaster recovery and may be located in a different geographical location as compared to the primary server. The stand-by server contains an exact replica of the data, databases, operating states, configurations, etc. as the primary server, so that in the event a disaster occurs at the primary server rendering the primary server non-functional, client system 110 may be redirected to the standby server, and operations may proceed normally.

Client system 110 enables users to input and submit data associated with transactions (e.g., transactions for financial purposes, transactions for testing purposes, transactions associated with any type of database, etc.) to server system 120 to perform transactions, with the outputs of the transactions stored in database 125. The server system 120 may include a log file module 20, shown in FIG. 2B, to generate one or more log files. Server system 120 may also include a backup module 30, also shown in FIG. 2B, to create a backup image of database 125.

Client system 110 may present a graphical user (e.g., GUI, etc.) or other interface (e.g., command line prompts, menu screens, etc.) to solicit information from users pertaining to transactions, and may provide reports including results of transactions (e.g., account balances, lists of transactions, dates, account summaries, companies associated with transactions, etc.).

Database system 125 may store various information pertaining to transactions (e.g., account balances, lists of transactions, timestamps, variables, etc.). The database system 125 may be implemented by any conventional or other database or storage unit, may be local to or remote from server system 120 and client system 110, and may communicate via any appropriate communication medium (e.g., local area network (LAN), wide area network (WAN), Internet, hardwire, wireless link, Intranet, etc.). It is understood that database 135, shown as part of server system 130, is a replica or mirror of database 125, shown as part of server system 120.

FIG. 1B shows an example of a disaster event at server system 120. Server system 120, and therefore, database 125, which is part of server system 120, becomes inaccessible. Accordingly, as database 135 of server system 130 is a replica of database 125, server system 130 may now be designated as the "Primary" server system, and client system 110 may be configured to access server system 130 to conduct ongoing transactions. As shown in FIG. 1B, once server system 130 is designated as the primary system, log files corresponding to ongoing transactions may be created and stored in a local archive, e.g., log archive 155. In this figure, dashed lines correspond to loss of connectivity.

However, protection against data loss has been suspended, as server 130 is not in communication with a stand-by system. Until a stand-by system, mirroring the current state of server system 130 is established, data loss protection will not be available.

Referring to FIG. 1C, an illustration is shown of an example computing environment for a system having disaster recovery capabilities and where accelerated recovery is performed in accordance with an embodiment of the present invention. According to present invention embodiments, in order to reestablish a stand-by system in an accelerated manner, e.g., a stand-by system on server system 160, a backup image of server system 130 including database 135 is sent to server system 160, and database 135 is restored on server system 160 as database 137. During the time that the backup image is being restored on server system 160, log files generated from ongoing transactions in server system 130 begin to accumulate in log archive 155. In order to accelerate the recovery process, lightweight database 170 is instantiated, based upon received information from server system 130, and is utilized to receive and store log files from server system 130, as described throughout the specification. Log files may be stored in a repository, e.g., archive 165.

In some embodiments, server 160 may correspond to server 120, e.g., if server 120 experiences a hardware failure, server 120 may be repaired, and a new stand-by server system may be implemented on server 120.

Server systems 130, 160 and client system 110 may be remote from each other and communicate over a network 140. The network may be implemented by any number of any suitable communications media (e.g., wide area network (WAN), local area network (LAN), Internet, Intranet, etc.). Alternatively, server systems 130, 160 and client system 110 may be local to each other, and communicate via any appropriate local communication medium (e.g., local area network (LAN), hardwire, wireless link, Intranet, etc.).

Figure 2A:
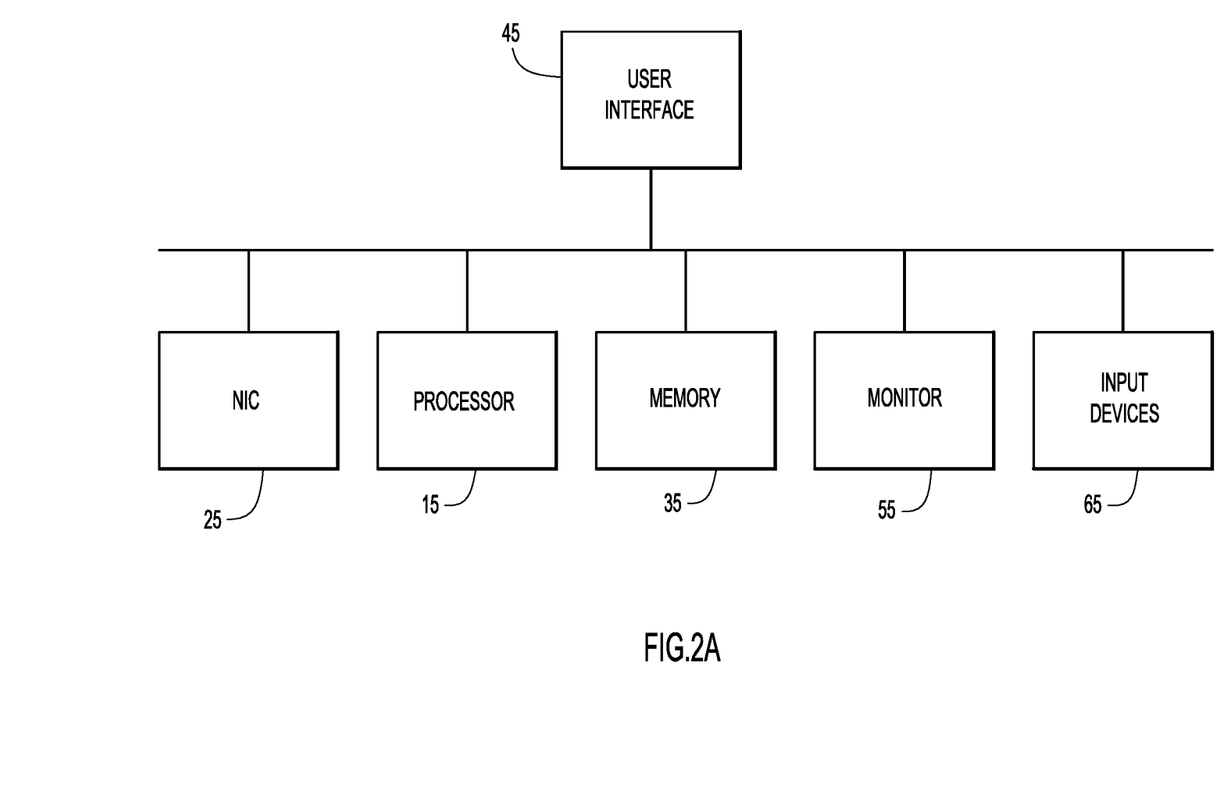
FIG. 2A shows an illustration of an example client system architecture for providing input data for transactions in accordance with an embodiment of the present invention.
Figure 2B:
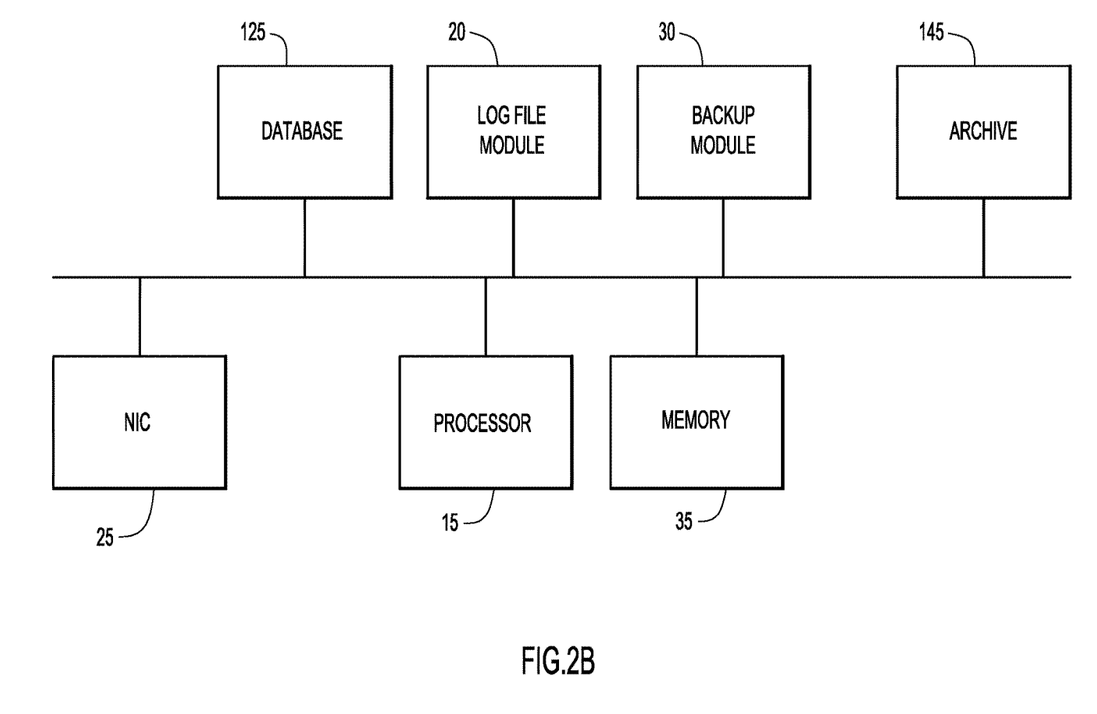
FIG. 2B shows an illustration of an example primary server system architecture having disaster recovery capabilities in accordance with an embodiment of the present invention.
Figure 2C:
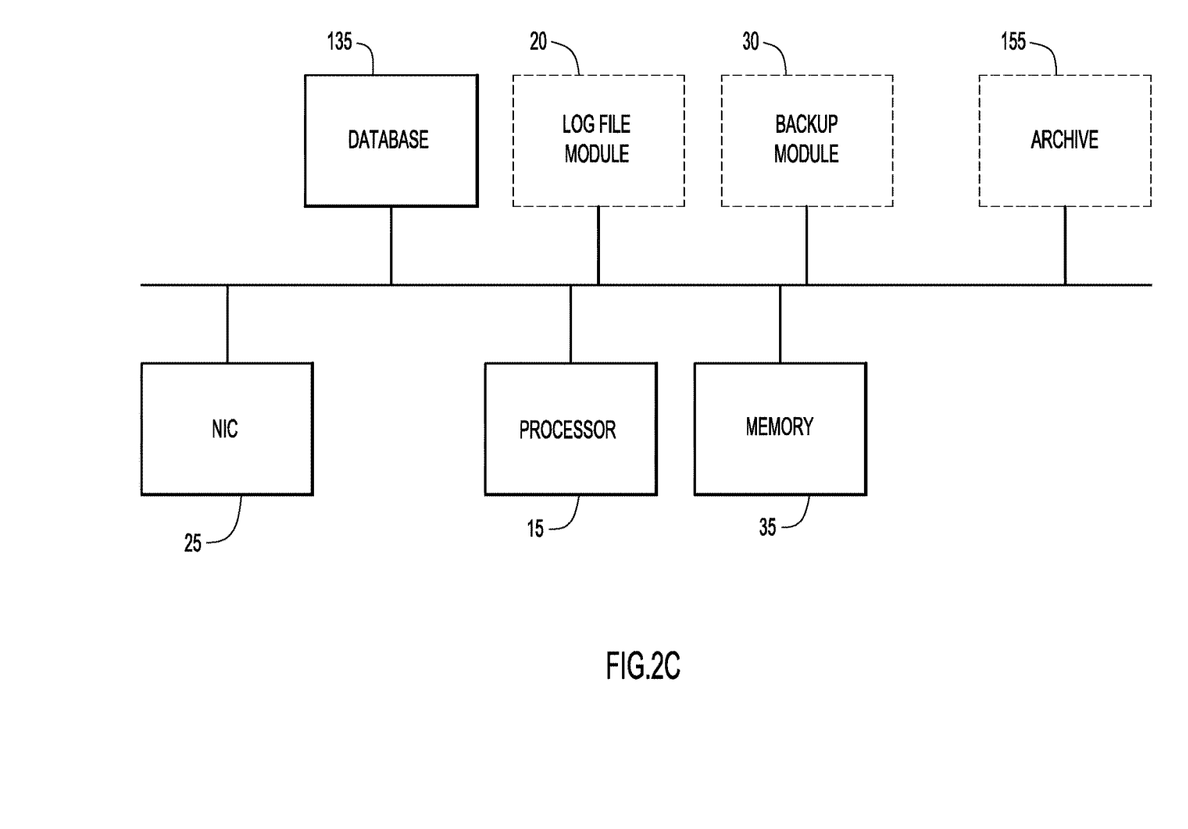
FIG. 2C shows an illustration of an example stand-by system architecture for having disaster recovery capabilities in accordance with an embodiment of the present invention.

Referring to FIGS. 2A-2C, server systems 120, 130, 160 and client system 110 may be implemented by any conventional or other computer system preferably equipped with a display or monitor, a base (e.g., including at least one processor 15, one or more memories 35 and/or internal or external network interfaces or communications devices 25 (e.g., modem, network cards, etc.)), (optional) input devices 65, (optional) monitors 55 (e.g., a keyboard, mouse or other input device), and any commercially available and custom software (e.g., server/communications software, database software, browser/interface software, etc.).

FIG. 2A shows an example of client system 110. In addition to the aforementioned components, client system 110 may include a user interface 45 for communicating with database 125 of server system 120 (or any primary server system). The user interface may be used to enter input data pertaining to transactions, supply such data to the primary server to conduct transactions, and view results from such transactions.

FIG. 2B shows an example of a primary server, e.g., server 120. In addition to the aforementioned components, primary server 120 includes database 125, modules 20 and 30, and a local archive 145 for storing log files related to transactions. Database 125 may be utilized for conducting transactions requested by client system 110. Modules, such as log file module 20 and backup module 30 may include one or more modules or units to perform the various functions of present invention embodiments described herein. For example, log file module 20 may be used to generate log files containing information pertaining to transactions. The log files may then be transmitted as packets 127 to archive 145 for local storage and to the stand-by system to protect against data loss. Backup module 30 may be used to generate a backup image of all or a portion of the primary server, including files, operating system information, configuration information, etc. The backup file may be utilized as part of a disaster recovery process to bring a new stand-by system online. The various modules (e.g., backup module 30, log file module 20, etc.) may be implemented by any combination of any quantity of software and/or hardware modules or units, and may reside within memory 35 of the server systems for execution by processor 15 or any other designated memory location.

FIG. 2C shows an example of a stand-by server, e.g., server 130. In addition to the aforementioned components, stand-by server 130 may include database 135 (a replica of database 125 of the primary server) for processing log file transactions received from primary server 120. It is understood that in the event the stand-by server becomes the primary server, transactions may continue to be processed as usual, and log file generation and backups may continue normally via log file module 20, backup module 30, and archive 155.

Figure 2D:
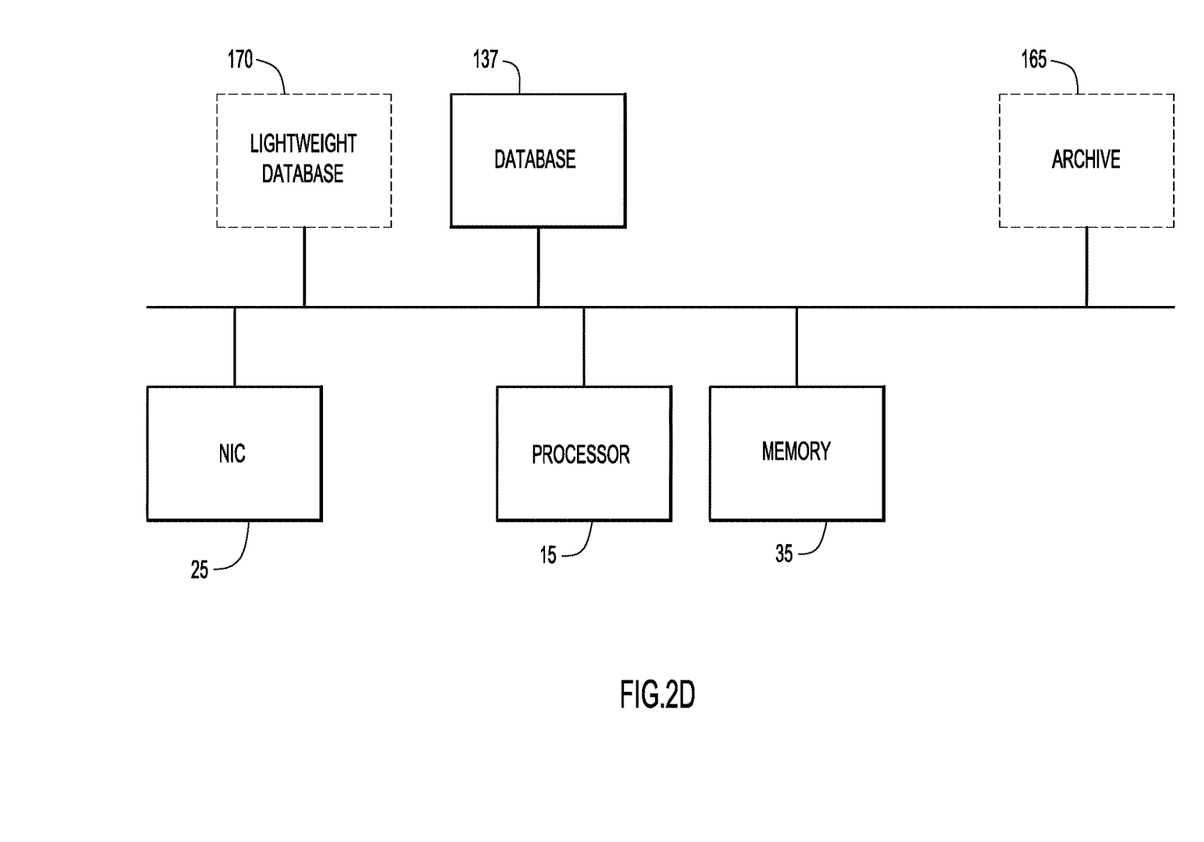
FIG. 2D shows an illustration of an example stand-by system architecture having a lightweight database with accelerated disaster recovery capabilities in accordance with an embodiment of the present invention.

FIG. 2D shows an example of a new stand-by server being brought online, e.g., server 160, according to present invention embodiments. In addition to the aforementioned components, server 160 includes database 137, lightweight database 170 and local archive 165. In the event that a disaster occurs at server system 120 and stand-by server system 130 is designated as the new primary server, server system 160 may be brought online as a new stand-by server. In some embodiments, server system 130 may provide information, e.g., configuration information and metadata to instantiate a lightweight database 170, on server system 160.

Lightweight database 170 may receive log file transactions from server 130, and may store these transactions in local memory with regard to database 137. Lightweight database 170 may be brought online prior to the restoration of database 137.

Lightweight database 170 functions to receive logs from the primary server, and store the log files, e.g., in a corresponding database log directory, on a spool to a different directory, or any other location designated by the lightweight database. Accordingly, lightweight database 170 may begin receiving packets 127 and storing these packets in local archive 165 prior to database 135 restoration (as database 137). Once fully configured, e.g., the database is restored and all log files applied, database 137 of server system 160 mirrors database 135, providing disaster recovery capabilities to the system as a stand-by system.

Figure 3:
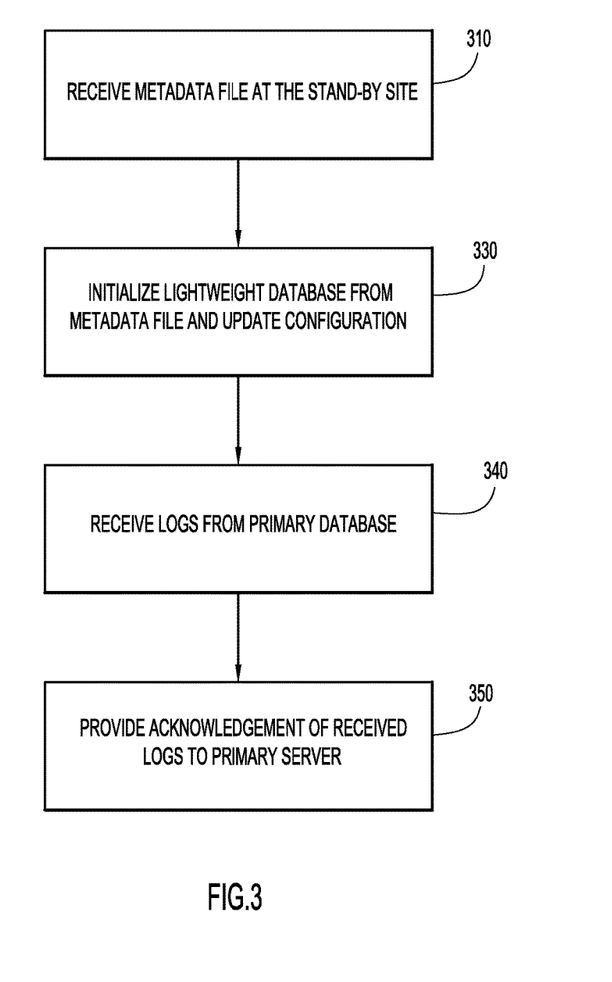
FIG. 3 is a procedural flowchart showing example operations performed at a stand-by system having accelerated recovery capabilities in accordance with an embodiment of the present invention.

Referring to FIG. 3, a flowchart is provided that shows example operations pertaining to establishment of a lightweight database at stand-by server system 160. At operation 310, a metadata file is received from server system 130. The metadata file may include database 135 information such as identity information, database seed, log sequence number at which the last backup was taken, disaster recovery configurations, etc. The database seed may comprise information associated with authentication, e.g., a database identifier, to help control access to a given database. The disaster recovery configuration may comprise the host name, port number, service name, or any other information needed to connect with the primary server.

The metadata file may be generated on the primary server and may include the log shipping position, also referred to as the log sequence number. After lightweight database 170 is set up on stand-by server system 160 from the metadata file, a connection is established between the primary server and lightweight database 170. Once the connection is established, lightweight database 170 sends the log shipping position to the primary server, requesting to initiate data log shipping from a given position, e.g., the position corresponding to the earliest log file, determined by a timestamp or other numeric reference, not included in the backup file. This earliest log file and all subsequently generated log files will not be present in the backup, and will need to be shipped to lightweight database 170 for replay on the stand-by system. In some embodiments, the log shipping position included in the metadata file will be based on the most recent backup, provided that the user ships the most recent backup image to the stand-by server. In other embodiments, the log shipping position may be based on the backup image shipped, and the user will provide the path to the backup image to the metadata generation tool. A request from the stand-by system to the primary system to initiate transfer of a plurality of log files may include an initial log file associated with the log file identifier (e.g., log shipping position or any other type of log identifier).

In general, the metadata file is a small file that may be quickly transmitted over a network e.g., a timescale of a few seconds or a few minutes.

At operation 330, a lightweight database 170 may be initialized based upon the received metadata file and configuration update information. At operation 340, once the lightweight database is online, the lightweight database may receive logs from primary database, in this case, server system 130. In some embodiments, log files stored locally to server system 130, e.g., in archive 155, may be sent to server system 160. For example, using the configuration information in the metadata file, the new stand-by server system 160 may establish a connection between the primary server system 130 and the light-weight database 170. Thus, the lightweight database 170 may start receiving logs from the primary system before the backup image (corresponding to database 137) has been fully restored. The log files may be stored in a repository, e.g., archive 165, local to server system 160 and local to lightweight database 170. At operation 350, acknowledgement of received logs to server system 130 may be provided to protect database 135 from data loss in the event the primary system fails while the standby is initializing. For instance, the standby system may acknowledge that the log file has been stored to disk, and only after this acknowledgement, does the primary commit the transaction. As long as the backup image is available/accessible to the stand-by system, database 135 may be restored, and by replaying all committed modifications to the primary server system, via application of the log files, the stand-by system can be configured to mirror the primary server system.

Figure 4:
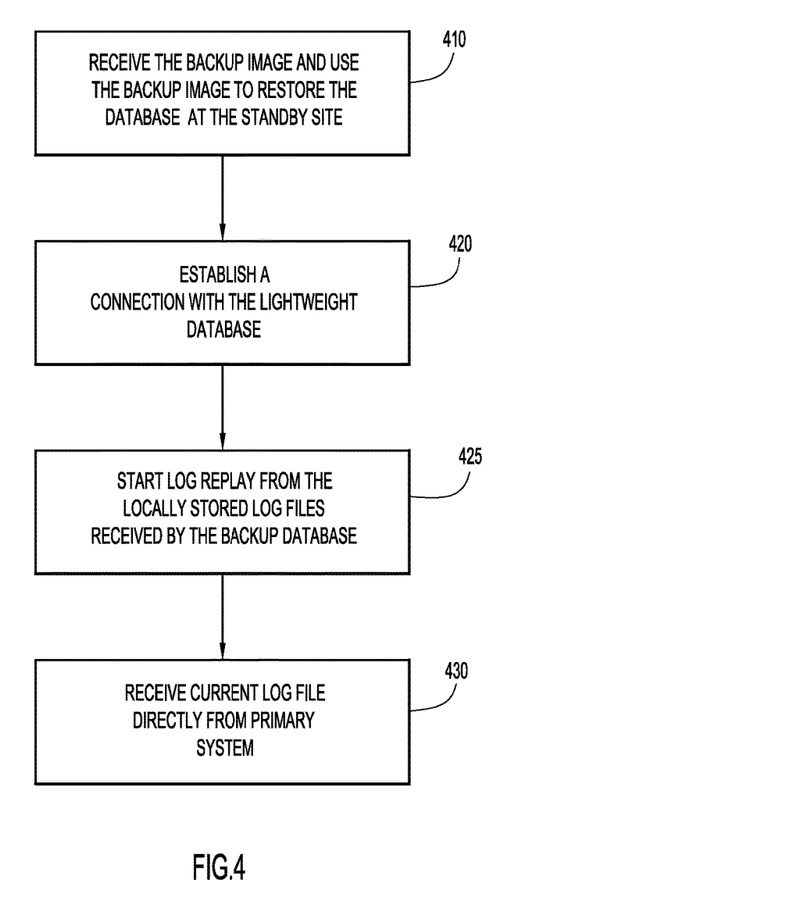
FIG. 4 is a procedural flowchart showing example operations performed in parallel with the operations of FIG. 3, at a stand-by system having accelerated recovery capabilities in accordance with an embodiment of the present invention.

Referring to FIG. 4, a flowchart is provided that shows example operations pertaining to establishment of database 137 at stand-by server 160 after a disaster event. At operation 410, a backup image is received and used to restore database 135 (as database 137). This image may be sent from server system 130. At this stage, database 137 does not contain information pertaining to recent transactions, e.g., transactions that have been processed since the disaster event occurred. Once the database has been restored, the database may start replaying log records, which are stored locally on the stand-by system, e.g., in archive 165. In some embodiments, in order to obtain recent transactional information, a connection is made with the lightweight database 170 at operation 420 to exchange information regarding location and receipt of log files, e.g., communication may occur using a variety of protocols, such as a handshaking protocol, etc. In some embodiments, the stand-by server, with the restored backup, will search its local directory, a local archive, and/or an archive in which the lightweight database has stored received log files, in order to locate and replay all relevant log files to reach a state without data loss.

At operation 425, once the location of the log files are known, e.g., via the information in the lightweight database, database 137 may replay each log file, e.g., in the order that the log files were generated. Once replay of transactions catches up with the most recent transaction that is being processed on the primary, the stand-by server system may now receive the log files directly from the primary system, at operation 430. At this stage, the stand-by system 160 mirrors server system 130.

Figure 5:
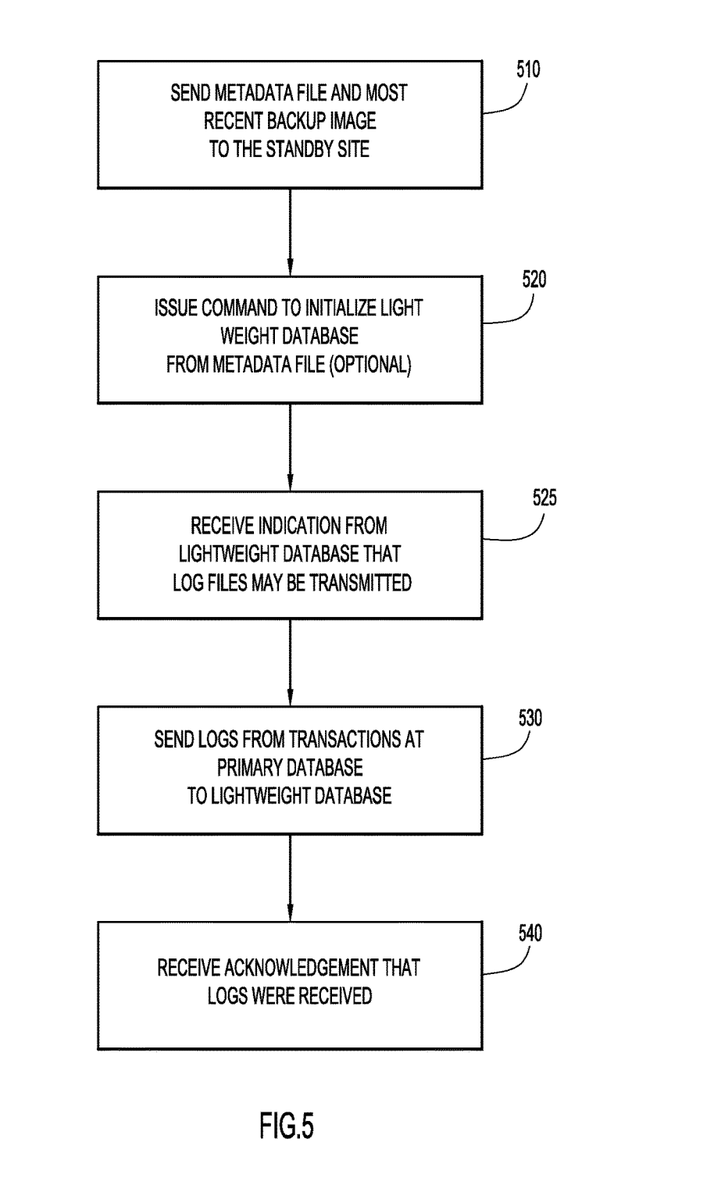
FIG. 5 is a procedural flowchart showing example operations performed by a primary system having accelerated disaster recovery capabilities in accordance with an embodiment of the present invention.

Referring to FIG. 5, a flowchart is shown regarding example operations pertaining to initiating a stand-by system, from the perspective of server system 130. At operation 510, the metadata file and the most recent backup image are sent to the stand-by site, e.g., server 160. At operation 520, an (optional) command may be issued to initialize a lightweight database. Alternatively, initialization of the lightweight database may be triggered upon receipt of the metadata file and backup image at the stand-by server system, or initiated by a network administrator. At operation 525, an indication is received that the lightweight database is ready to receive log files. At operation 530, logs from transactions locally stored at the primary database are sent to the lightweight database. At operation 540, confirmation or acknowledgement is received, confirming that the transmitted log files were received and stored at the stand-by server system. As previously discussed, in some embodiments, transactions are committed to a primary system upon confirmation of receipt at a stand-by system. The lightweight database acknowledges the receipt of log data to the primary and this protects the database from data loss in the event the primary system fails while the standby is initializing. Once all logs have been replayed on the stand-by system, transactions may be sent directly to database 137 of the stand-by system from the primary system.

Figure 6:
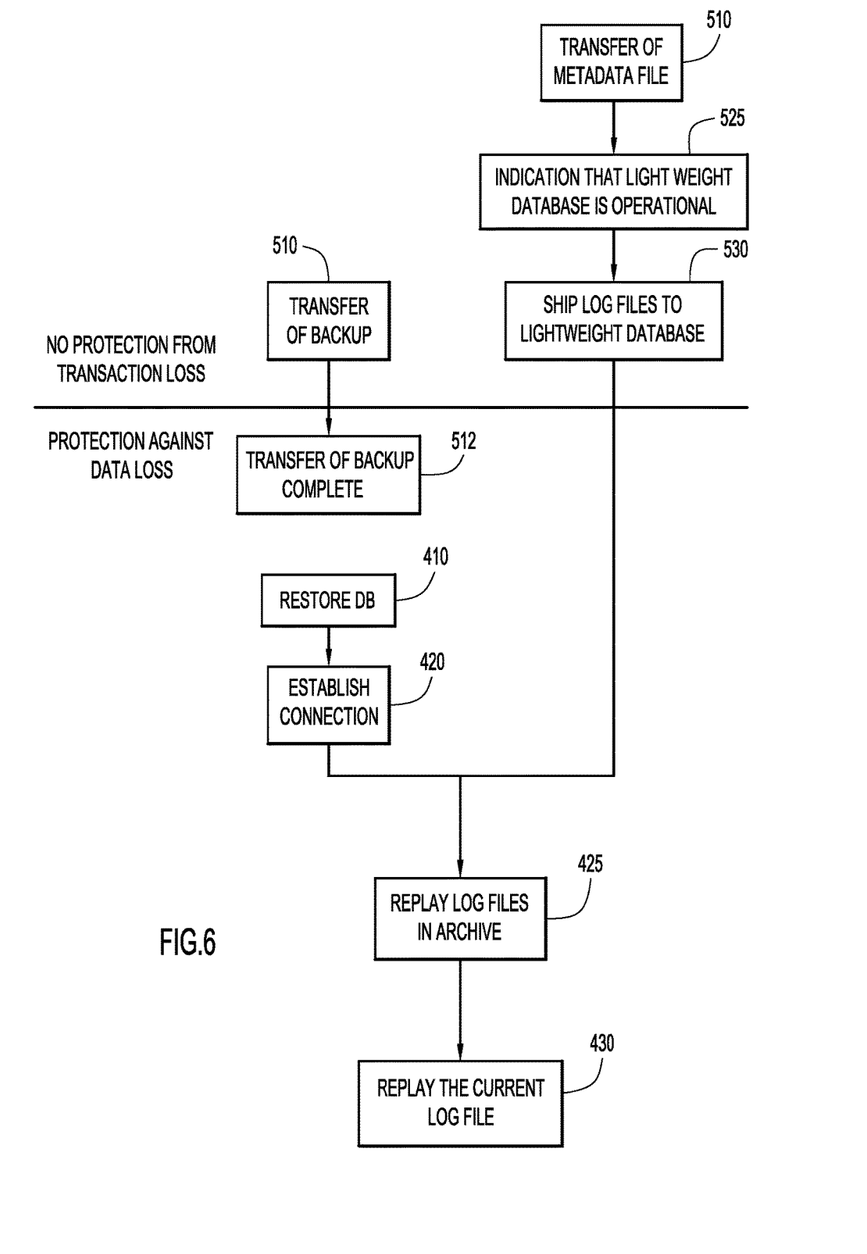
FIG. 6 is a procedural flowchart showing performance of the example operations of FIGS. 4 and 5 to accelerate recovery, in accordance with an embodiment of the present invention.

FIG. 6 shows a flowchart showing example operations from FIGS. 4 and 5 occurring in parallel processes. The reader is referred to FIGS. 4 and 5 for details regarding individual operations.

In this example, transfer of the image backup occurs in parallel with transfer of the metadata file, as shown in operation 510. Transfer of the backup completes at operation 512, providing protection against data loss. While the database 135 is being transferred and restored at the stand-by server at operation 410, log files are shipped to the lightweight database at operation 530.

This flow restores protection against data loss at an earlier stage than conventional methods, in which protection is restored after database restoration is complete. Additionally, it is considerably cheaper from a computational stand point for the primary system to ship log files, as the log files are being generated, to the stand-by system (and while the log files are still in local memory), rather than ship the log files at a subsequent point in time. If log files are read from a disk or accessed from a non-local archive (e.g., tape or network archive), throughput to applications served by log files would likely be reduced.

Advantages of present invention embodiment include speeding up recovery time, protecting against data loss while the stand-by system is being initialized, and reducing workload on the primary system. For example, recovery time may be improved by shipping logs to a stand-by system concurrently with transferring and subsequently restoring the backup image on the stand-by system. Shipping the logs to the lightweight database as they are generated by the primary database and acknowledging receipt prevents against data loss in the event the primary site suffers from a catastrophic event while the standby system is being brought online. Without present invention embodiments, if the primary were to fail when the standby system was being initialized and brought online, any modifications to the primary site would be lost. Moreover, since the primary database ships the logs to the stand-by system as the logs are generated (and still in memory), computational workload is reduced. Otherwise, the primary system may need to read log files from disk or access them from a non-local (e.g., tape and/or network) archive, potentially increasing the time needed to bring a stand-by system online.

It will be appreciated that the embodiments described above and illustrated in the drawings represent only a few of the many ways of implementing embodiments for accelerating recovery after a disaster.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, client software, transactional software, etc.). These systems may include any types of monitors and input devices (e.g., keyboard, mouse, voice recognition, etc.) to enter and/or view information.

It is to be understood that the software (e.g., transaction software, log file generation module, backup module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., transaction software, log file generation module, backup module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., transaction data, log file data, image backup data, etc.). The database system may be implemented by any number of any conventional or other databases, data stores or storage structures (e.g., files, databases, data structures, data or other repositories, etc.) to store information (e.g., transaction data, log file data, image backup data, etc.). The database system may be included within or coupled to the server and/or client systems. The database systems and/or storage structures may be remote from or local to the computer or other processing systems, and may store any desired data (e.g., transaction data, log file data, image backup data, etc.).

The present invention embodiments may employ any number of any type of user interface (e.g., Graphical User Interface (GUI), command-line, prompt, etc.) for obtaining or providing information (e.g., transaction data, account balance data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., dates, transaction ID no, etc.).

The present invention embodiments are not limited to the specific tasks or algorithms described above, but may be utilized for any activity which involves database restoration or replication, e.g., setting up a test database. In addition, present invention embodiments may apply to a non-disaster recovery system in which a backup from a production database is periodically restored to a development system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method of restoring data from a first system onto a second system comprising:
transferring from the first system to the second system a metadata file and initializing a database on the second system based on the metadata file;

transferring from the first system to the second system an image including information of the first system to be restored on the second system and initiating restoration of the information to the second system based on the image;

during the restoration of the image on the second system, transferring from the first system to the initialized database on the second system one or more log files indicating transactions performed on the first system during the restoration of the image on the second system and relating to the information to be restored; and in response to completion of the restoration, performing the transactions of the log files to synchronize the restored data on the second system with the first system.

2. The method of claim 1, wherein the second system is a standby system and the image includes state information of the first system, and wherein the restoration includes:

configuring the standby system as the first system in response to a failure of the first system.

3. The method of claim 1, wherein the image includes back-up information for a data source, and the restoration includes:

restoring the data source on the second system based on the back-up information.

4. The method of claim 1, further comprising:

sending an acknowledgment from the second system to the first system in response to receipt of a log file; and performing an action of the received log file at the first system upon receiving the acknowledgement from the second system in order to prevent data loss.

5. The method of claim 1, wherein transferring the one or more log files includes:

transferring from the first system to the initialized database on the second system the one or more log files as each log file is generated on the first system;

storing the one or more log files in memory local to the second system to minimize bandwidth from retrieving the stored log files; and performing actions of the one or more stored log files on the second system.

6. The method of claim 1, wherein the metadata file indicates a log file identifier, and initializing the database further includes:

transferring a request from the database to the first system to initiate transfer of a plurality of log files including an initial log file associated with the log file identifier and one or more subsequent log files.

7. The method of claim 1, performed as part of a disaster recovery process.

8. The method of claim 1, wherein transferring the one or more log files from the first system to the initialized database on the second system occurs concurrently with transferring the image from the first system to the second system to reduce setup time of the second system.

* * * * *